United States Patent
Akahira et al.

(10) Patent No.: US 6,227,647 B1
(45) Date of Patent: May 8, 2001

(54) INK-JET PRINT APPARATUS AND METHOD USING A PIVOTING INK-JET RECORDING HEAD

(75) Inventors: Makoto Akahira; Tetsuo Okabe, both of Kawasaki; Hiroshi Fujiike, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/934,565

(22) Filed: Sep. 22, 1997

(30) Foreign Application Priority Data

Sep. 30, 1996 (JP) ............................ 8-259163
Sep. 11, 1997 (JP) ............................ 9-246928

(51) Int. Cl.$^7$ .................................................. B41J 2/07
(52) U.S. Cl. ............................................................ 347/24
(58) Field of Search ...................... 347/24, 40, 42, 347/37, 12, 13, 22, 32, 29–30

(56) References Cited

U.S. PATENT DOCUMENTS

| | | | |
|---|---|---|---|
| 4,313,124 | 1/1982 | Hara | 347/24 |
| 4,345,262 | 8/1982 | Shirato et al. | 347/24 |
| 4,459,600 | 7/1984 | Sato et al. | 347/24 |
| 4,463,359 | 7/1984 | Ayata et al. | 347/24 |
| 4,558,333 | 12/1985 | Sugitani et al. | 347/24 |
| 4,608,577 | 8/1986 | Hori | 347/24 |
| 4,723,129 | 2/1988 | Endo et al. | 347/24 |
| 4,740,796 | 4/1988 | Endo et al. | 347/24 |
| 5,359,355 | * 10/1994 | Nagoshi et al. | 347/9 |
| 5,847,723 | * 12/1998 | Akahira et al. | 347/14 |
| 5,917,518 | 6/1999 | Ohashi et al. | 347/37 |
| 5,956,063 | 9/1999 | Yokoi et al. | 347/107 |
| 5,984,470 | * 11/1999 | Sakino et al. | 347/106 |

FOREIGN PATENT DOCUMENTS

| | | |
|---|---|---|
| 0 107 502 | 5/1984 | (EP) . |
| 0 395 004 | 10/1990 | (EP) . |
| 0 636 485 | 2/1995 | (EP) . |
| 0 753 766 | 1/1997 | (EP) . |
| 0 754 553 | 1/1997 | (EP) . |
| 2 134 045 | 8/1984 | (GB) . |
| 54-56847 | 5/1979 | (JP) . |
| 59-75205 | 4/1984 | (JP) . |
| 59-123670 | 7/1984 | (JP) . |
| 59-138461 | 8/1984 | (JP) . |
| 59-165661 | 9/1984 | (JP) . |
| 60-71260 | 4/1985 | (JP) . |
| 60-159066 | 8/1985 | (JP) . |
| 63-235901 | 9/1988 | (JP) . |
| 63-290756 | 11/1988 | (JP) . |
| 63-294503 | 12/1988 | (JP) . |
| 1-122441 | 5/1989 | (JP) . |
| 1-217302 | 8/1989 | (JP) . |
| 1-217320 | 8/1989 | (JP) . |
| 2-269059 | 11/1990 | (JP) . |
| 5-96728 | 4/1993 | (JP) . |
| 6-31937 | 2/1994 | (JP) . |
| 6-286140 | 10/1994 | (JP) . |
| 8-82707 | 3/1996 | (JP) . |
| 8-086913 | 4/1996 | (JP) . |
| 8-174854 | 7/1996 | (JP) . |

* cited by examiner

*Primary Examiner*—N. Le
*Assistant Examiner*—K. Feggins
(74) *Attorney, Agent, or Firm*—Fitzpatrick, Cella, Harper & Scinto

(57) ABSTRACT

It is an object of the present invention to provide an ink-jet print apparatus which can easily cope with the manufacture of a plurality of types of color filters having different pixel pitches. In order to achieve this object, an ink-jet print apparatus for performing a print operation on a recording member by discharging an ink thereon while scanning an ink-jet head relative to the recording member is provided. This apparatus includes a motor for pivoting the ink-jet head relative to the scanning direction, a restoring unit for restoring the ink discharging state of the ink-jet head, and a control unit for controlling the pivot angle of the ink-jet head.

26 Claims, 12 Drawing Sheets

7: LIGHT-TRANSMITTING PORTION
2: BLACK MATRIX
1: SUBSTRATE

3': RESIN COMPOSITION LAYER

4': PHOTOMASK
5': NON-COLORED PORTION

INK-JET HEAD

8: PROTECTIVE LAYER

FIG. 12

RELATIONSHIP BETWEEN SCREEN SIZE AND HEAD RESOLUTION

| SIZE | NUMBER OF DOTS | PIXEL SIZE (μm) | HEAD MOUNTING ANGLE (deg) | | |
|---|---|---|---|---|---|
| | | | 360dpi (70.5μm) | 300dpi (84.6μm) | 600dpi (42.3μm) |
| 9.4 (DIAGONAL : 24) 192 × 144 | 640 × 480 VGA | 100 × 300 | 31.672 (EVERY FIFTH NOZZLE) | 27.56 (EVERY FOURTH NOZZLE) | 27.56 (EVERY EIGHTH NOZZLE) |
| 10.4 (DIAGONAL : 26) | 640 × 480 VGA | 110 × 330 | 20.582 (EVERY FIFTH NOZZLE) | 12.79 (EVERY FOURTH NOZZLE) | 12.79 (EVERY EIGHTH NOZZLE) |
| 10.4 (DIAGONAL : 26) | 800 × 600 SVGA | 88 × 264 | 20.582 (EVERY FOURTH NOZZLE) | 38.73 (EVERY FOURTH NOZZLE) | 26.93 (EVERY SEVENTH NOZZLE) |
| 10.4 (DIAGONAL : 26) | 1024 × 768 XGA | 70 × 210 | 6.828 (EVERY THIRD NOZZLE) | 34.17 (EVERY THIRD NOZZLE) | 6.828 (EVERY FIFTH NOZZLE) |
| 11.3 (DIAGONAL : 29) | 800 × 600 SVGA | 96 × 288 | 35.212 (EVERY FIFTH NOZZLE) | 31.67 (EVERY FOURTH NOZZLE) | 13.43 (EVERY SEVENTH NOZZLE) |
| 12.1 (DIAGONAL : 31) | 800 × 600 SVGA | 102 × 306 | 29.763 (EVERY FOURTH NOZZLE) | 25.28 (EVERY FOURTH NOZZLE) | 25.28 (EVERY EIGHTH NOZZLE) |
| 12.1 (DIAGONAL : 31) | 1024 × 768 XGA | 80 × 240 | 31.672 (EVERY FOURTH NOZZLE) | 18.98 (EVERY THIRD NOZZLE) | 18.98 (EVERY SIXTH NOZZLE) |
| 13.6 276.48 × 207.36 | 1024 × 768 XGA | 90 × 270 | 16.775 (EVERY FOURTH NOZZLE) | 37.07 (EVERY FOURTH NOZZLE) | 24.24 (EVERY SEVENTH NOZZLE) |
| 15.0 307.2 × 245.76 | 1280 × 1024 SXGA | 80 × 240 | 31.672 (EVERY FOURTH NOZZLE) | 18.98 (EVERY THIRD NOZZLE) | 18.98 (EVERY SIXTH NOZZLE) |
| 17.4 345.6 × 276.48 | 1280 × 1024 SXGA | 90 × 270 | 16.775 (EVERY FOURTH NOZZLE) | 37.07 (EVERY FOURTH NOZZLE) | 24.24 (EVERY SEVENTH NOZZLE) |
| 19.0 384.0 × 307.2 | 1600 × 1280 SXGA | 80 × 240 | 31.672 (EVERY FOURTH NOZZLE) | 18.98 (EVERY THIRD NOZZLE) | 18.98 (EVERY SIXTH NOZZLE) |

INK-JET PRINT APPARATUS AND METHOD USING A PIVOTING INK-JET RECORDING HEAD

BACKGROUND OF THE INVENTION

The present invention relates to an ink-jet print apparatus and method which print an image on a recording medium by discharging an ink thereon while scanning an ink-jet head relative to the recording medium.

With recent advances in personal computers, especially portable personal computers, the demand tends to arise for liquid crystal displays, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, any method capable of satisfying all the requirements has not been established. The respective methods will be described below.

The first method is a pigment dispersion method. In this method, a pigment-dispersed photosensitive resin layer is formed on a substrate and patterned into a single-color pattern. This process is repeated three times to obtain R, G, and B color filter layers.

The second method is a dyeing method. In the dyeing method, a water-soluble polymer material as a dyeable material is applied onto a glass substrate, and the coating is patterned into a desired shape by a photolithographic process. The obtained pattern is dipped in a dye bath to obtain a colored pattern. This process is repeated three times to form R, G, and B color filter layers.

The third method is an electrodeposition method.

In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Thereafter, the resin is thermoset to form colored layers.

The fourth method is a print method. In this method, a pigment is dispersed in a thermosetting resin, a print operation is performed three times to form R, G. and B coatings separately, and the resins are thermoset, thereby forming colored layers. In either of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, it is difficult to apply this method to TFTs. In the print method, a pattern with a fine pitch is difficult to form because of poor resolution and poor evenness.

In order to eliminate these drawbacks, methods of manufacturing color filters by an ink-jet system are disclosed in Japanese Patent Laid-Open Nos. 59-75205, 63-235901, 63-294503, and 1-217320.

In general, when a color filter is to be manufactured by using such an ink-jet system, an elongated ink-jet head having a plurality of discharging nozzles is scanned relative to a color filter substrate so as to color a plurality of pixel arrays of the color filter. In this case, since color filters differ in their display areas and pixel pitches, the pitch of the discharging nozzles of the ink-jet head does not necessarily coincide with the pitch of the pixel arrays of a color filter to be manufactured. For this reason, the elongated ink-jet head is inclined at a predetermined angle with respect to the scanning direction to match the pitch of every plurality of nozzles with the pitch of the pixel arrays of the color filter. In this case, it costs much to design an ink-jet head while changing its nozzle pitch. For this reason, an ink-jet head having only one nozzle pitch is used. In this method, to cope with different pixel pitches, the inclination angle of the ink-jet head with respect to the scanning direction is generally changed. Conventionally, the inclination angle of such an ink-jet head with respect to the scanning direction is designed in accordance with the pixel pitch of a color filter to be manufactured and is fixed. When, therefore, color filters with different pixel pitches are to be manufactured, the inclination angle of the ink-jet head is changed. For this reason, a plurality of types of mounting portions must be prepared for the scanning mechanism of the ink-jet head. It takes much labor and cost to design and manufacture a plurality of types of mounting portions for the ink-jet head in accordance with the types of color filters to be manufactured.

In addition, in a color filter manufacturing apparatus using an ink-jet head, to restore the ink-jet head from the clogging state or the like to the normal state, a restoring mechanism for sucking/restoring the nozzles of the ink-jet head is often used. The angle of this suction mechanism must be set in accordance with the inclination of the ink-jet head. Conventionally, the angle of this restoring mechanism is set in accordance with the pixel pitch of a color filter to be manufactured. When, therefore, color filters with different pixel pitches are to be manufactured, the angle of the restoring mechanism must be changed.

SUMMARY OF THE INVENTION

The present invention has been made in consideration of the above problems, and has as its object to provide an ink-jet print apparatus and method which can easily cope with the manufacture of a plurality of types of color filters having different pixel pitches.

In order to solve the above problems and achieve the above object, an ink-jet print apparatus of the present invention is characterized by the following arrangement according to its first aspect.

There is provided an ink-jet print apparatus for performing a print operation on a recording member by discharging an ink thereon while scanning an ink-jet head relative to the recording member, comprising pivoting means for pivoting the ink-jet head relative to the scanning direction, restoring means for restoring an ink discharging state of the ink-jet head, and control means for controlling a pivot angle of the ink-jet head.

An ink-jet print method of the present invention is characterized by the following process according to its first aspect.

There is provided an ink-jet print method of performing a print operation on a recording member by discharging an ink thereon while scanning an ink-jet head relative to the recording member, comprising the pivoting step of pivoting the ink-jet head through a first predetermined angle relative to the scanning direction, the print step of performing a print operation on the recording medium by discharging an ink while scanning the ink-jet head relative to the recording medium in a state in which the ink-jet head is pivoted through the first predetermined angle, and the restoring step of performing a discharging/restoring operation for the ink-jet head by pivoting the ink-jet head through a second predetermined angle relative to the scanning direction.

An ink-jet print apparatus of the present invention is characterized by the following arrangement according to its second aspect.

There is provided an ink-jet print apparatus for performing a print operation on a recording member by discharging an ink thereon while scanning an ink-jet head having a plurality of ink discharging nozzles relative to the recording member, comprising changing means for changing an ink discharging pitch in a direction perpendicular to the scanning direction, restoring means for restoring an ink discharging state of the ink-jet head, and positioning means for matching relative positions of the ink-jet head and the restoring means with each other by correcting a change in the relative positions of the ink-jet head and the restoring means with a change in the ink discharging pitch.

An ink-jet print method of the present invention is characterized by the following process according to its second aspect.

There is provided an ink-jet print method of performing a print operation on a recording member by discharging an ink thereon while scanning an ink-jet head having a plurality of ink discharging nozzles relative to the recording member, comprising the changing step of changing an ink discharging pitch in a direction perpendicular to the scanning direction, the adjusting step of adjusting a position of restoring means for restoring an ink discharging state of the inkjet head in accordance with a change in position of the ink-jet head with a change in the ink discharging pitch, the print step of performing a print operation on the recording member by discharging an ink thereon while relatively scanning the ink-jet head and the recording member, and the restoring step of performing a discharging/restoring operation for the ink-jet head by using the restoring means.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 12 is a view showing the relationship between the nozzle pitch of an ink-jet head to be used, the size of a color filter to be manufactured, and an inclination angle corresponding to a pixel pitch.

DETAILED DESCRIPTION OF THE PREFERRED EMBODIMENT

A preferred embodiment of the present invention will be described below with reference to the accompanying drawings.

In this embodiment, a glass substrate is generally used as a substrate 1. However, a substrate other than a glass substrate can be used as long as it has characteristics required for a liquid crystal color filter, e.g., good transparency and high mechanical strength.

FIGS. 1A to 1F show an example of the process of manufacturing a color filter.

Figure 1A:
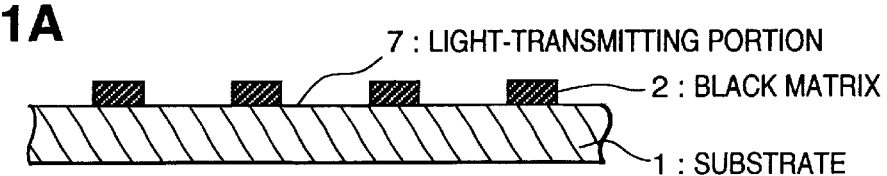
FIGS. 1A to 1F are sectional views for explaining the process of manufacturing a color filter.
Figure 1B:
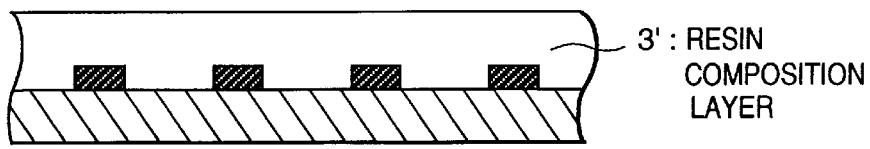

FIG. 1A shows the glass substrate 1 having a black matrix 2 constituted by light-transmitting portions 7 and light-shielding portions. First of all, the glass substrate 1, on which the black matrix 2 is formed, is coated with a resin composition which can be cured upon irradiation of light or irradiation of light and heating, and has ink receptivity. The resultant structure is pre-baked, as needed, to form a resin layer 31 (FIG. 1B). The resin layer 3' can be formed by a coating method such as spin coating, roller coating, bar coating, spraying, or dipping. However, the present invention is not limited to any specific coating method.

Figure 1C:
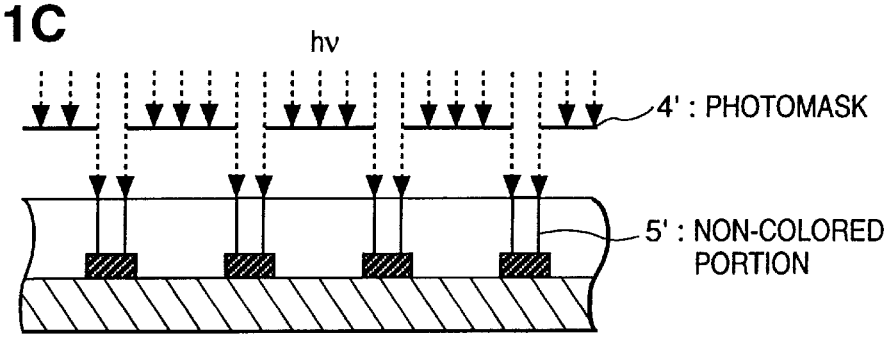
Figure 1D:
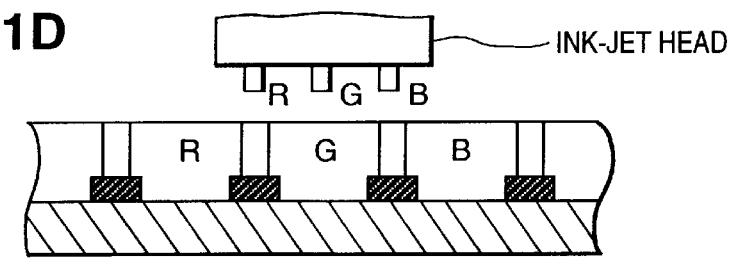
Figure 1E:
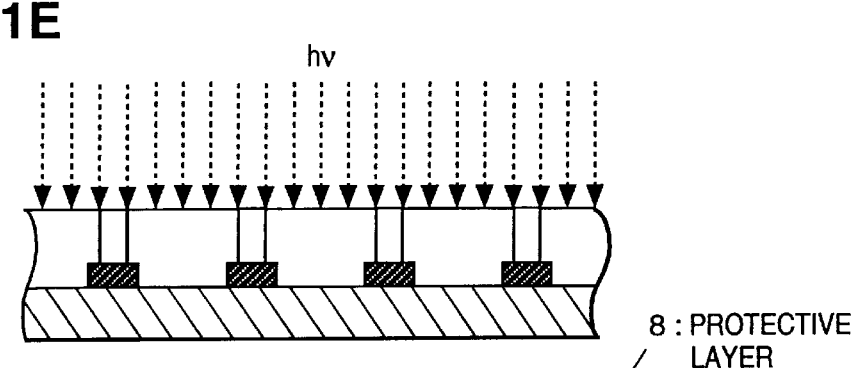

Subsequently, pattern exposure is performed in advance onto resin layer portions light-shielded by the black matrix 2 by using a photomask 4' to cure the exposed portions of the resin layer so as to form portions 5' (non-colored portions) which do not absorb an ink (FIG. 1C). Thereafter, the resin layer is colored in R, G, and B at once by using the ink-jet heads (FIG. 1D), and the inks are dried, as needed.

As the photomask 4' used when pattern exposure is performed, a mask having opening portions for curing the portions light-shielded by the black matrix is used. In this case, in order to prevent a color omission of the color material at a portion in contact with the black matrix, a relatively large amount of ink must be discharged. For this reason, a mask having opening portions each having a size smaller than the width of each light-shielding portion of the black matrix is preferably used.

As an ink to be used for a coloring operation, both dye and pigment inks can be used, and both liquid and solid inks can be used.

As a curable resin composition to be used in the present invention, any resin composition which has ink receptivity and can be cured by at least one of the following treatments: irradiation of light and a combination of irradiation of light and heating, can be used. As resins, acrylic resin, epoxy resin, and silicone resin are available. As cellulose derivatives, hydroxypropyl cellulose, hydroxy ethyl cellulose, methyl cellulose, carboxymethyl cellulose are available, and modified materials thereof are also available.

Optical initiators (crosslinkers) can also be used to crosslink these resins by irradiation of light or irradiation of light and heating. As optical initiators, dichromate, a bisazide compound, a radical-based initiator, a cation-based initiator, an anion-based initiator, and the like can be used. Mixtures of these optical initiators and combinations of the initiators and sensitizers can also be used. In addition, an optical acid generating agent such as onium salt can be used as a crosslinker. In order to make a crosslinking reaction further progress, a heat treatment may be performed after irradiation of light.

Resin layers containing these compositions have excellent heat resistance, excellent water resistance, and the like, and are sufficiently resistant to high temperatures and cleaning in the subsequent steps.

As an ink-jet system used in the present invention, a bubble-jet type using an electrothermal converter as an energy generating element, a piezoelectric jet type using a piezoelectric element, or the like can be used. A coloring area and coloring pattern can be arbitrarily set.

This embodiment exemplifies the structure in which the black matrix is formed on the substrate. However, after a curable resin composition layer is formed or after coloring is performed, a black matrix may be formed on the resin layer without posing any problem. That is, the form of a black matrix is not limited to that in this embodiment. As a method of forming a black matrix, a method of forming a thin metal film on a substrate by sputtering or deposition, and patterning the film by a photolithographic process is preferably used. However, the present invention is not limited to this.

Figure 1F:
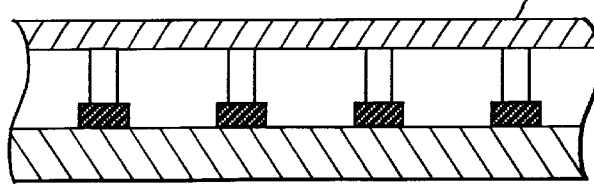

Subsequently, the curable resin composition is cured by performing only one of the following treatments: irradiation of light, a heat treatment, and a combination of irradiation of light and a heat treatment (FIG. 1E), and a protective layer 8 is formed, as needed (FIG. 1F). Note that reference symbol hv denotes the intensity of light. When a heat treatment is to be performed, heat is applied instead of hv. The protective layer 8 can be made of a second resin composition of a photo-setting type, thermosetting type, or photo-setting/thermosetting type. The resultant layer needs to have transparency upon formation of a color filter and be sufficiently resistant to the subsequent processes such as an ITO formation process and an aligning film formation process.

Although the resin composition is formed on the substrate in this embodiment, inks may be directly discharged onto the substrate in the following manner.

The ink-jet system is used to discharge R, G, and B inks onto the substrate to fill the light-transmitting portions of a black matrix which forms light-shielding portions. These R, G, and B patterns may be formed in the form of a so-called casting. Inks of the respective colors are preferably printed within the range in which they do not overlap on the black matrix.

As an ink to be used, both dye and pigment inks can be used as long as they can be set upon application of energy such as light and heat, and both liquid and solid inks can be used. The ink must contain a photo-setting component, a thermosetting component, or photo-setting/thermosetting component. As such components, various commercially available resins and curing agents can be used, and are not specifically limited as long as they do not cause problems such as retention in the ink. More specifically, acrylic resin, epoxy resin, melamine resin, and the like can be suitably used.

Figure 2:
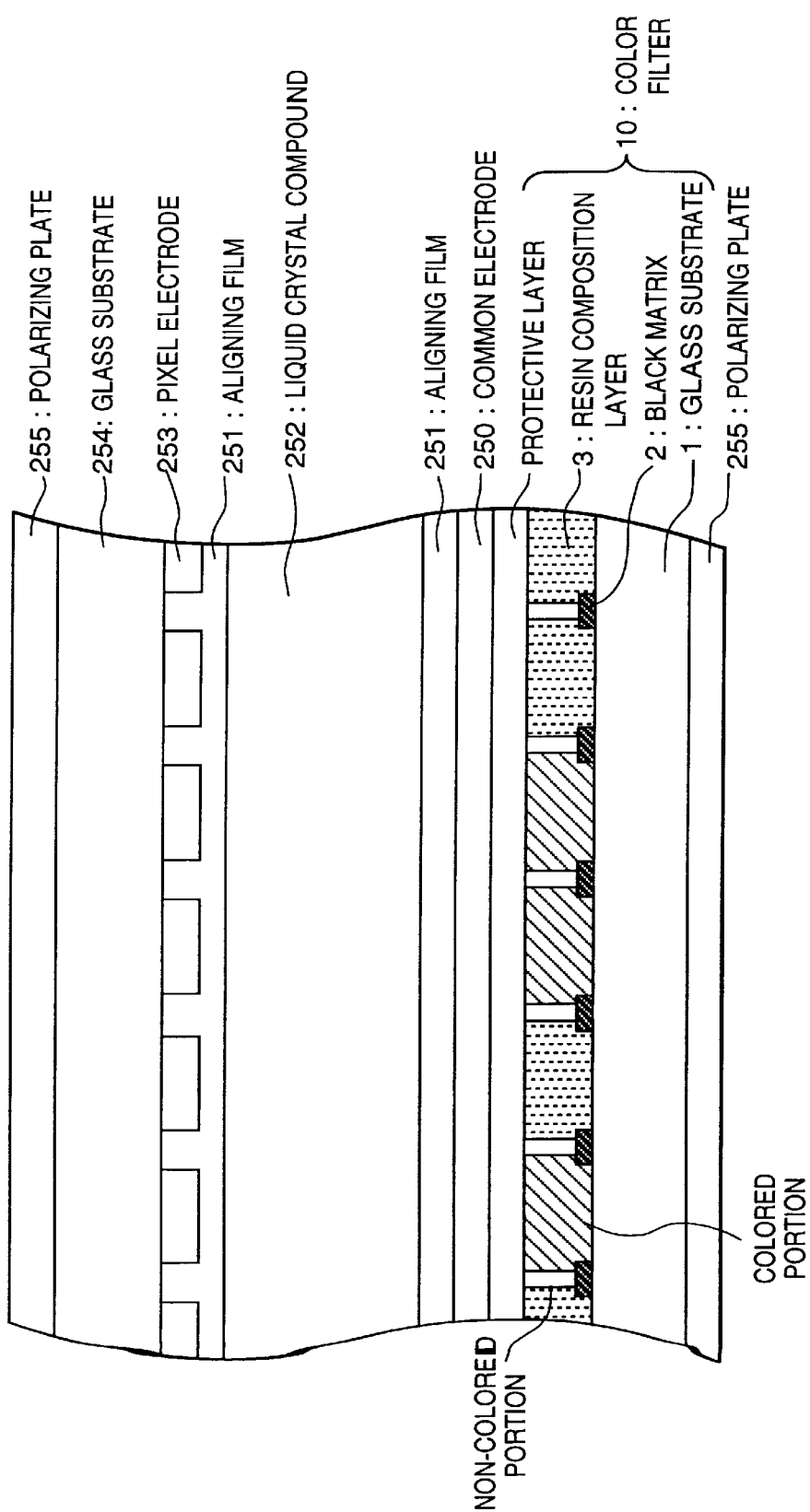
FIG. 2 is a sectional view showing the structure of a TFT liquid crystal panel incorporating a color filter manufactured by a manufacturing apparatus according to an embodiment of the present invention.

FIG. 2 is a sectional view of a TFT (Thin Film Transistor) color liquid crystal panel incorporating a color filter according to this embodiment. Note that the form of this panel is not limited to the one shown in FIG. 2.

In general, a color liquid crystal panel is formed by joining the color filter substrate 1 to a counter substrate 254 and sealing a liquid crystal compound 252 therebetween. TFTs (Thin Film Transistors) (not shown) and transparent pixel electrodes 253 are formed on the inner surface of one substrate 254 of the liquid crystal panel in a matrix form. A color filter 10 is placed on the inner surface of the other substrate 12 such that the R. G, and B coloring materials are positioned to oppose the pixel electrodes. A transparent counter electrode (common electrode) 250 is formed on the entire surface of the color filter 10. The black matrix 2 is generally formed on the color filter substrate 1 side. Aligning films 251 are formed within the planes of the two substrates. By performing a rubbing process for the aligning films 251, the liquid crystal molecules can be aligned in a predetermined direction. Polarizing plates 255 are bonded to the outer surface of the respective glass substrates. The liquid crystal compound 252 is filled in the gap (about 2 to 5 $\mu$m) between these glass substrates. As a backlight, a combination of a fluorescent lamp (not shown) and a scattering plate (not shown) is generally used. A display operation is performed by causing the liquid crystal compound to serve as an optical shutter for changing the transmittance for light emitted from the backlight.

Figure 3:
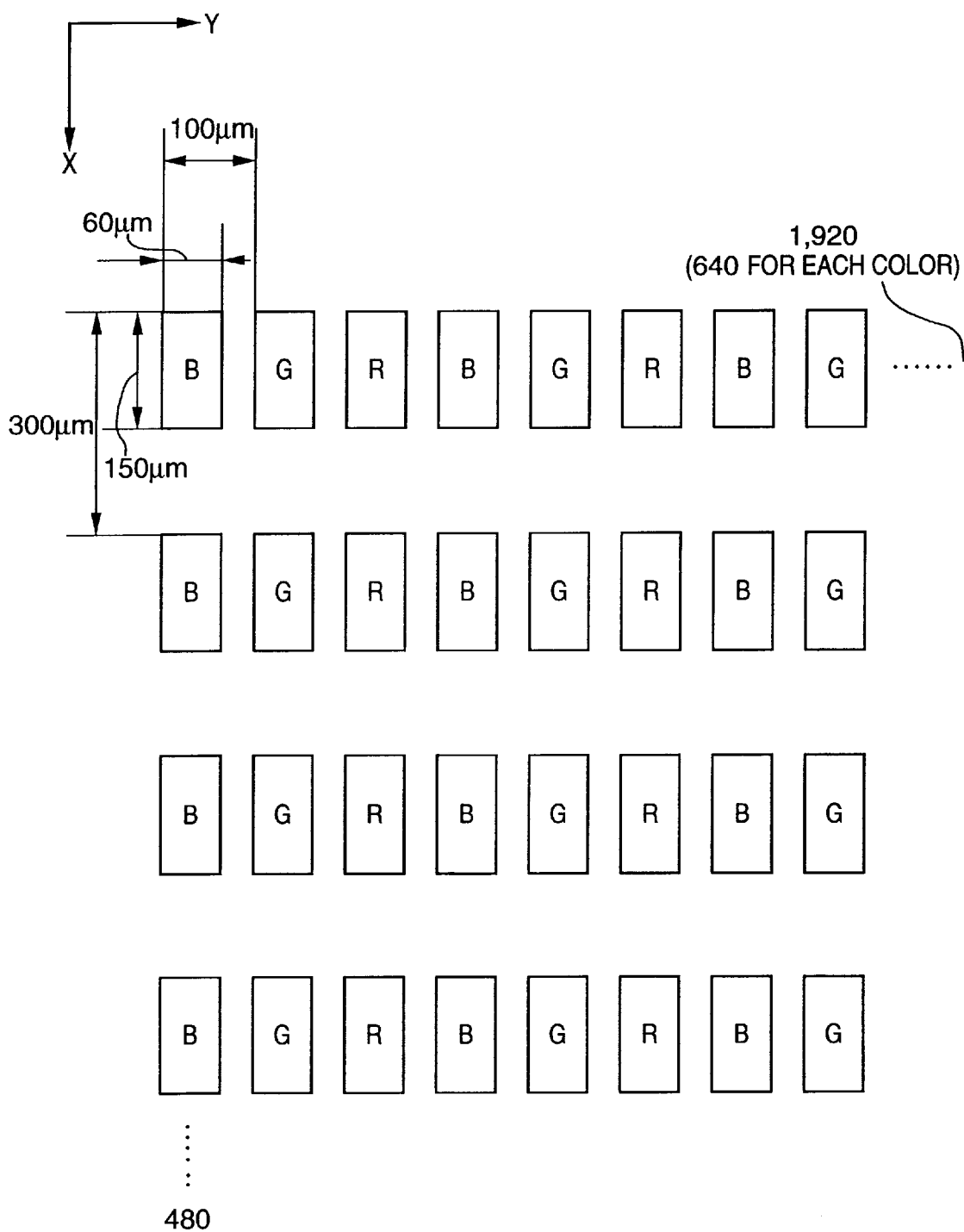
FIG. 3 is a view showing a color filter pattern manufactured by the manufacturing apparatus of the embodiment.

FIG. 3 shows an example of the color pattern of a color filter manufactured by the color filter manufacturing apparatus according to this embodiment. Each of the colored portions colored by R, G, and B inks is a pixel, which is almost rectangular. Assuming that the longitudinal direction of each pixel is the X direction, and the direction perpendicular to the X direction is the Y direction, each pixel has the same size, 150 $\mu$m×60 $\mu$m. The pitch in the X direction is 300 $\mu$m; and the pitch in the Y direction, 100 $\mu$m. Pixels of the same color are arranged in a line in the X direction, whereas pixels of different colors are alternately arranged in the Y direction. The pattern shown in FIG. 3 corresponds to the pattern of the black matrix formed in the step shown in FIG. 1A.

Figure 4:
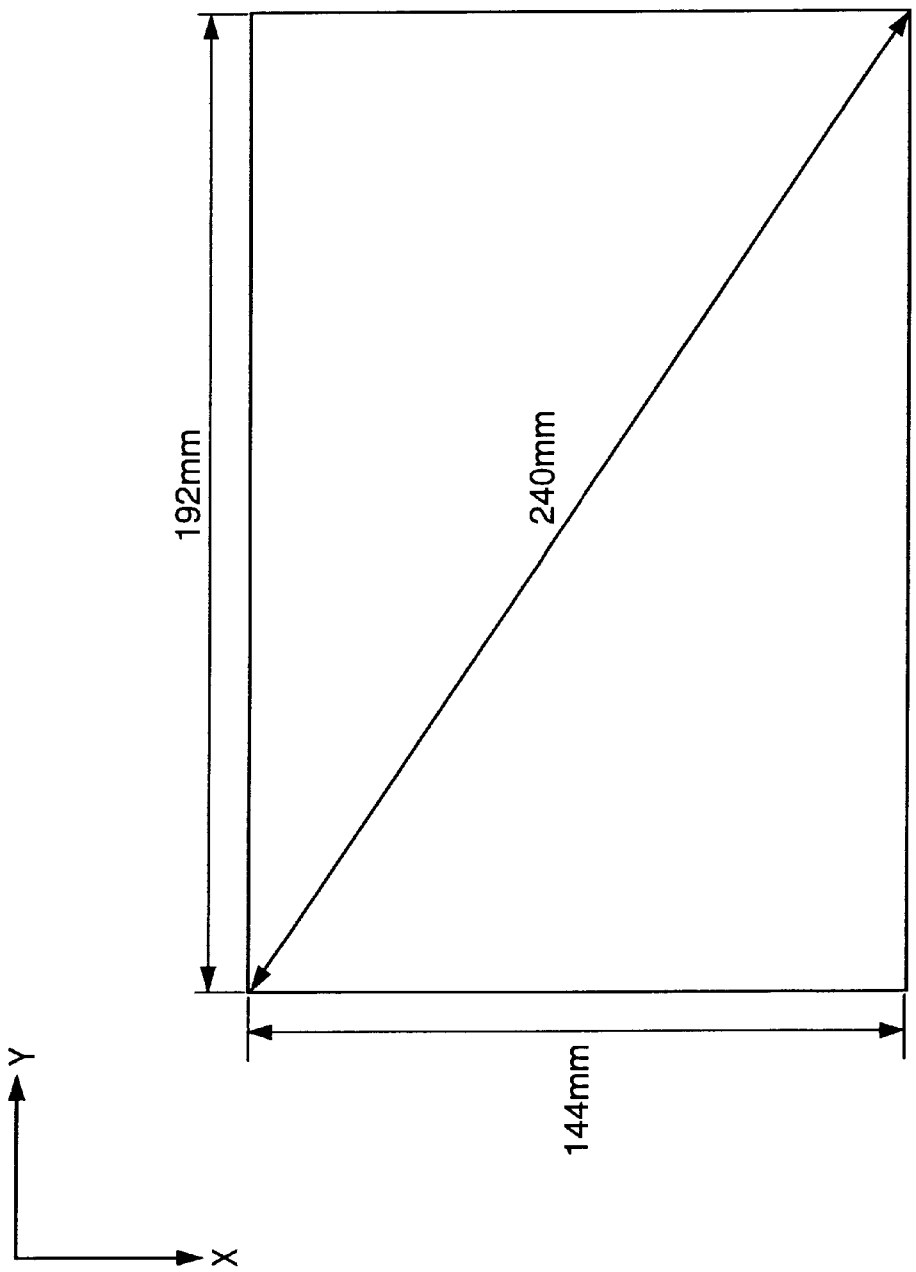
FIG. 4 is a chart showing the size of the display portion of a color filter manufactured by the manufacturing apparatus of the embodiment and incorporated in a TFT liquid crystal panel.

The number of pixels is 480 (X direction)×1,920 (640 in each color) (Y direction). As shown in FIG. 4, the size of the screen of the color filter is 144 mm×192 mm, which corresponds to a 9.4-inch liquid crystal panel measuring 240 mm diagonally.

Figure 5:
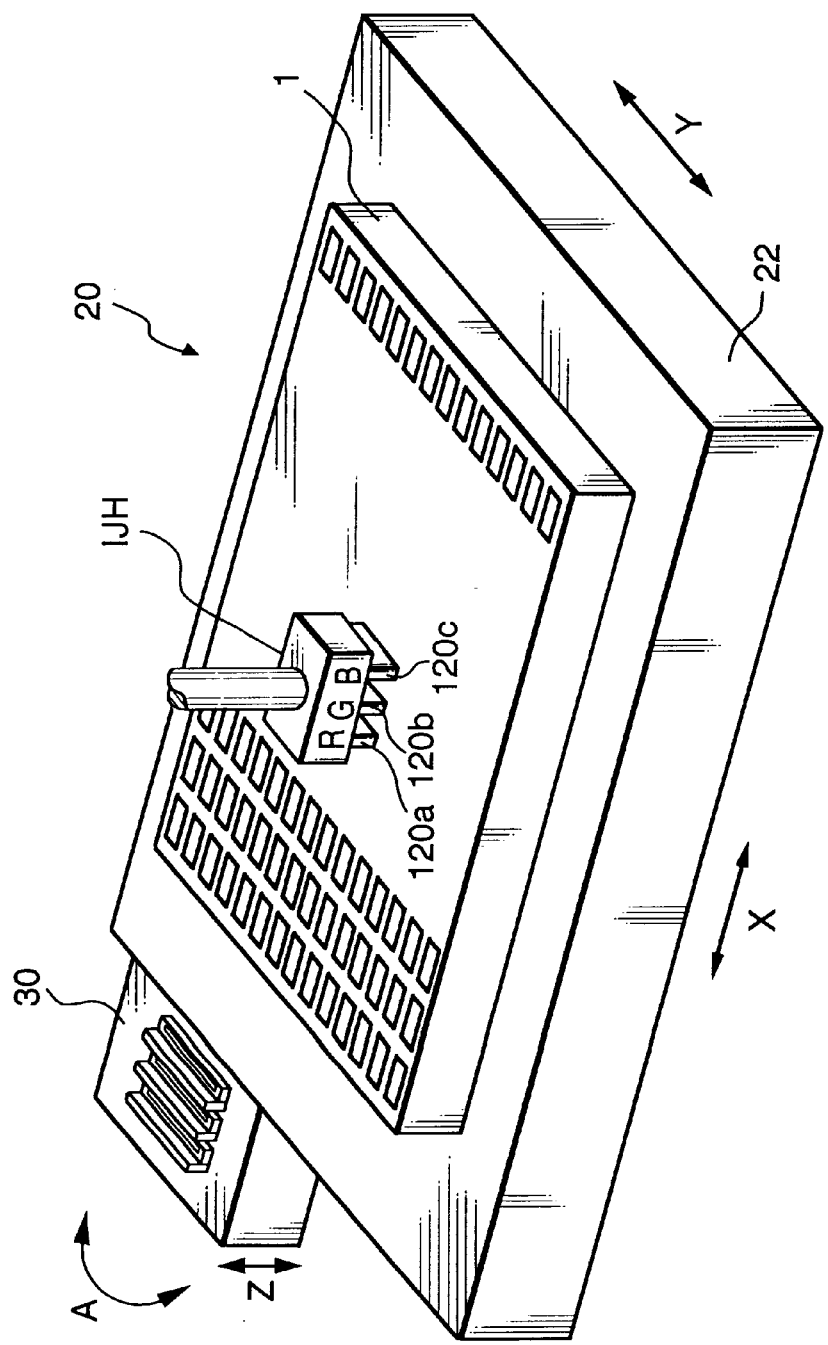
FIG. 5 is a perspective view showing the structure of a color filter manufacturing apparatus.

FIG. 5 shows the structure of the manufacturing apparatus for manufacturing the color filter in FIG. 4.

Referring to FIG. 5, a manufacturing apparatus 20 comprises an X-Y table 22 mounted on a base (not shown) and capable of moving in the X and Y directions in FIG. 5, and an ink-jet head IJH fixed on a base via a support member (not shown) above the X-Y table 22. The glass substrate 1 on which the black matrix 2 and a resin composition layer 3 are formed by the above method is placed on the X-Y table 22. The ink-jet head IJH includes a red head 120a for discharging a red ink, a green head 120b for discharging a green ink, and a blue head 120c for discharging a blue ink. These heads 120a, 120b, and 120c are designed to discharge inks independently.

A restoring unit 30 for performing a restoring operation for the ink-jet head IJH is mounted on an end portion of the X-Y table 22. The restoring unit 30 can move in the Z direction with respect to the X-Y table 22.

The restoring unit 30 has the function of maintaining a normal ink discharging operation by preventing the nozzles of the ink-jet head IJH from clogging and by wiping off inks or dust adhering to the nozzle surfaces of the ink-jet head IJH, and the function of preventing a color filter from becoming defective when dust falls from nozzle surfaces onto the glass substrate during a coloring operation. These functions will be described in detail later.

The process of coloring a color filter by using the manufacturing method of this embodiment will be described next.

First of all, the glass substrate 1 is set on the X-Y table 22 of the color filter manufacturing apparatus 20. After the glass substrate 1 is positioned in a predetermined manner, a color filter formation area (coloring area) of the glass substrate 1 is moved to a position immediately below the ink-jet head IJH. An ink is discharged while the ink-jet head IJH and the glass substrate 1 are relatively scanned by the X-Y table 22, thereby coloring each pixel of the color filter.

Figure 6:
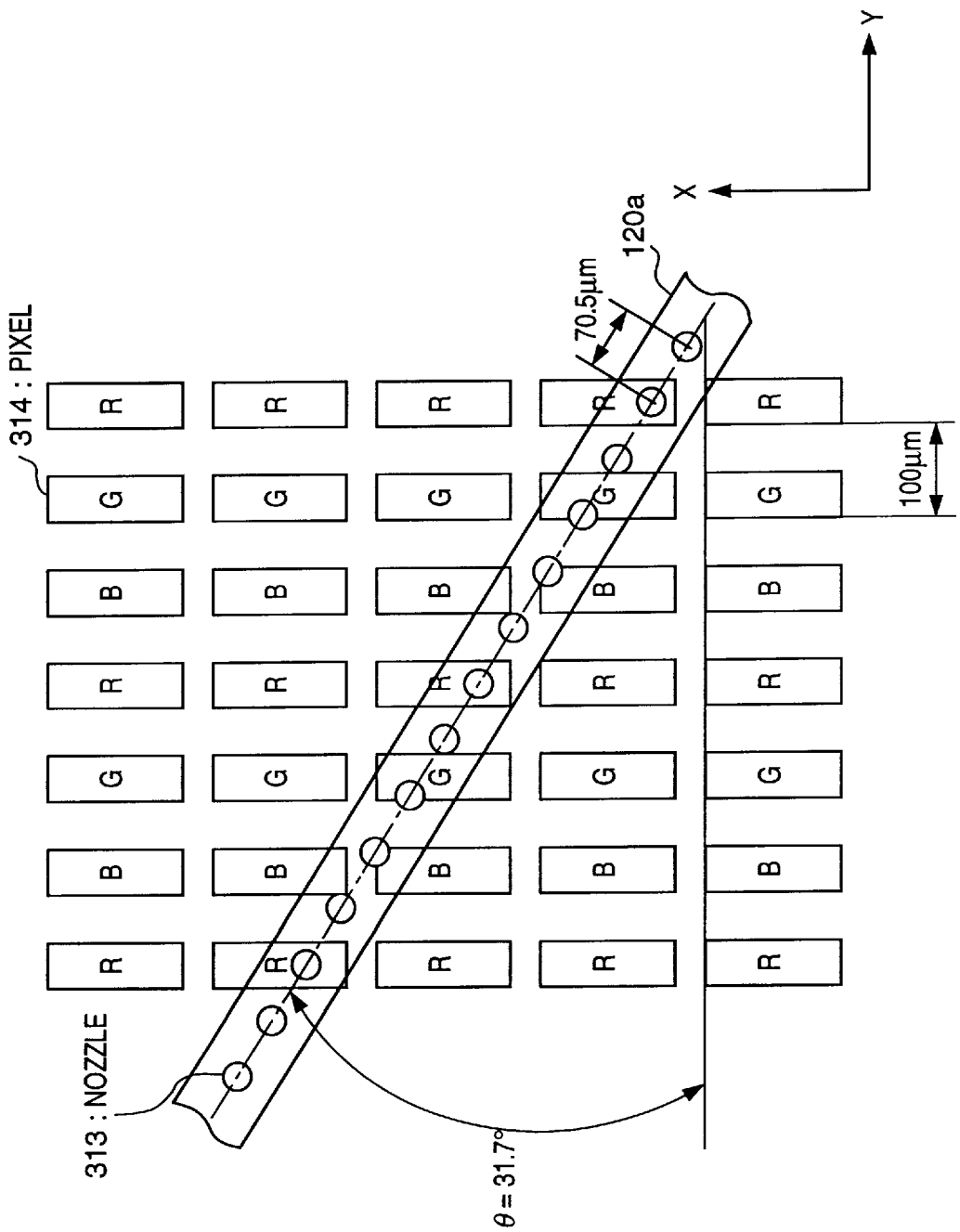
FIG. 6 is a view showing the relationship between an ink-jet head and each pixel in the process of coloring a color filter.

FIG. 6 shows the relationship between the glass substrate 1 and the head 120a, of the ink-jet head IJH used in this coloring operation, which discharges a red (R) ink.

Referring to FIG. 6, nozzles 313 are arranged at intervals of, e.g., 70.5 μm. When this head is to be used to color a color filter on which R, G, and B pixels 314 are orderly arranged at intervals of, e.g., 100 μm, the positions of the nozzles must be adjusted to red pixels arranged at intervals of 300 μm. For this reason, every fifth nozzle of the head 120a is used while the head 120a is inclined at θ=31.7° with respect to the scanning direction. With this operation, every fifth nozzle is positioned immediately above a red pixel to allow coloring. This relationship applies to the other heads 120b and 120c as well as the red head 120a.

Figure 7:
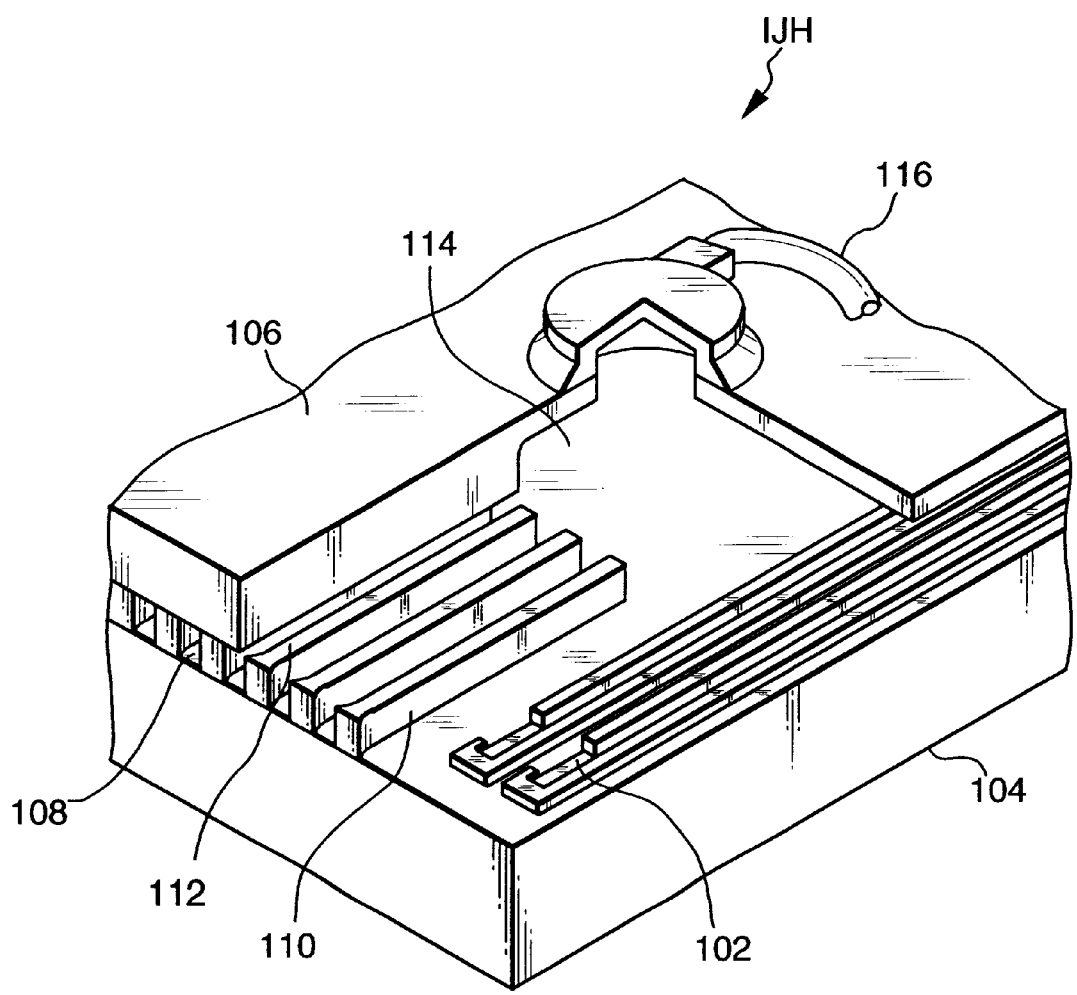
FIG. 7 is a perspective view showing the structure of the ink-jet head.

FIG. 7 shows the structure of the ink-jet head IJH for discharging inks onto the resin composition layer 3. Since these three heads 120a, 120b, and 120c have the same structure, FIG. 7 shows the structure of one of the three heads as a representative.

Referring to FIG. 7, the ink-jet head IJH mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 10 coincides with that of a corresponding fluid passage 110, and are assembled into the state shown in FIG. 7. Although FIG. 7 shows only two heaters 102, the heater 102 is arranged in correspondence with each fluid passage 110. When a predetermined driving signal is supplied to the heater 102 in the assembled state shown in FIG. 7, an ink above the heater 102 is boiled to produce a bubble, and the ink is pushed and discharged from the discharging opening 108 upon volume expansion of the ink.

Figure 8:
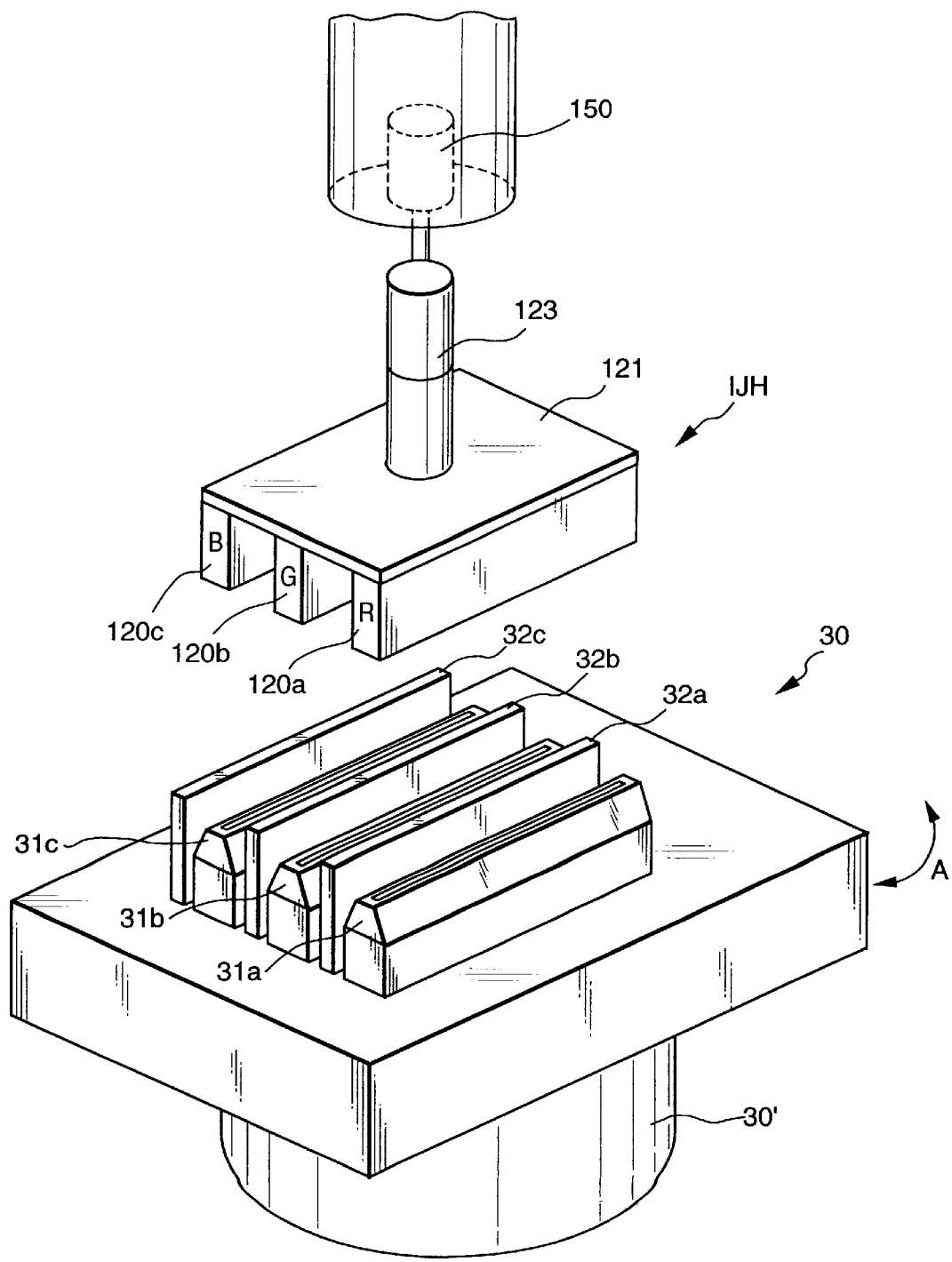
FIG. 8 is a perspective view showing the structure of the restoring unit of the manufacturing apparatus of the embodiment.
Figure 9:
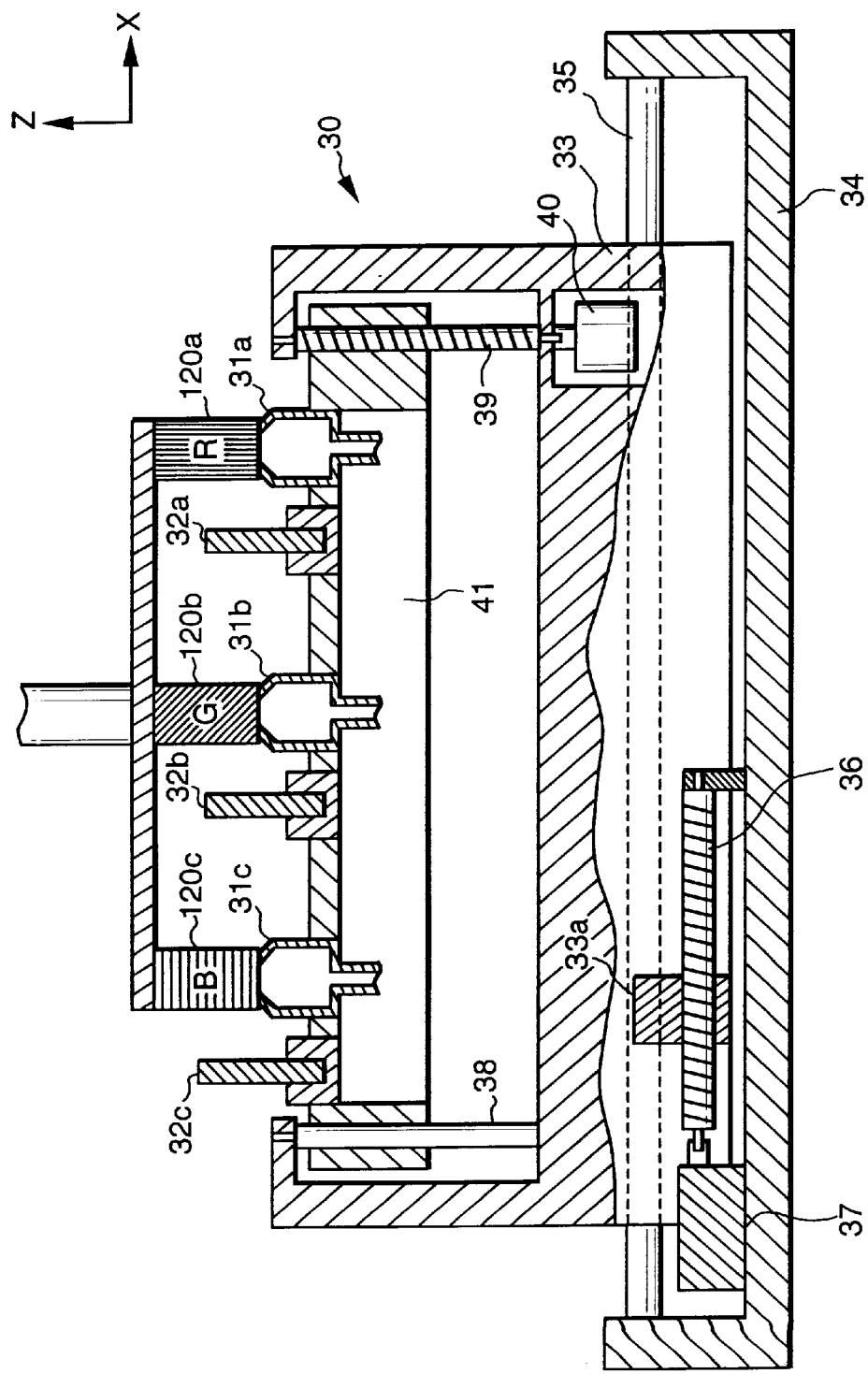
FIG. 9 is a sectional view showing a state in which the restoring unit is performing a capping operation.
Figure 10:
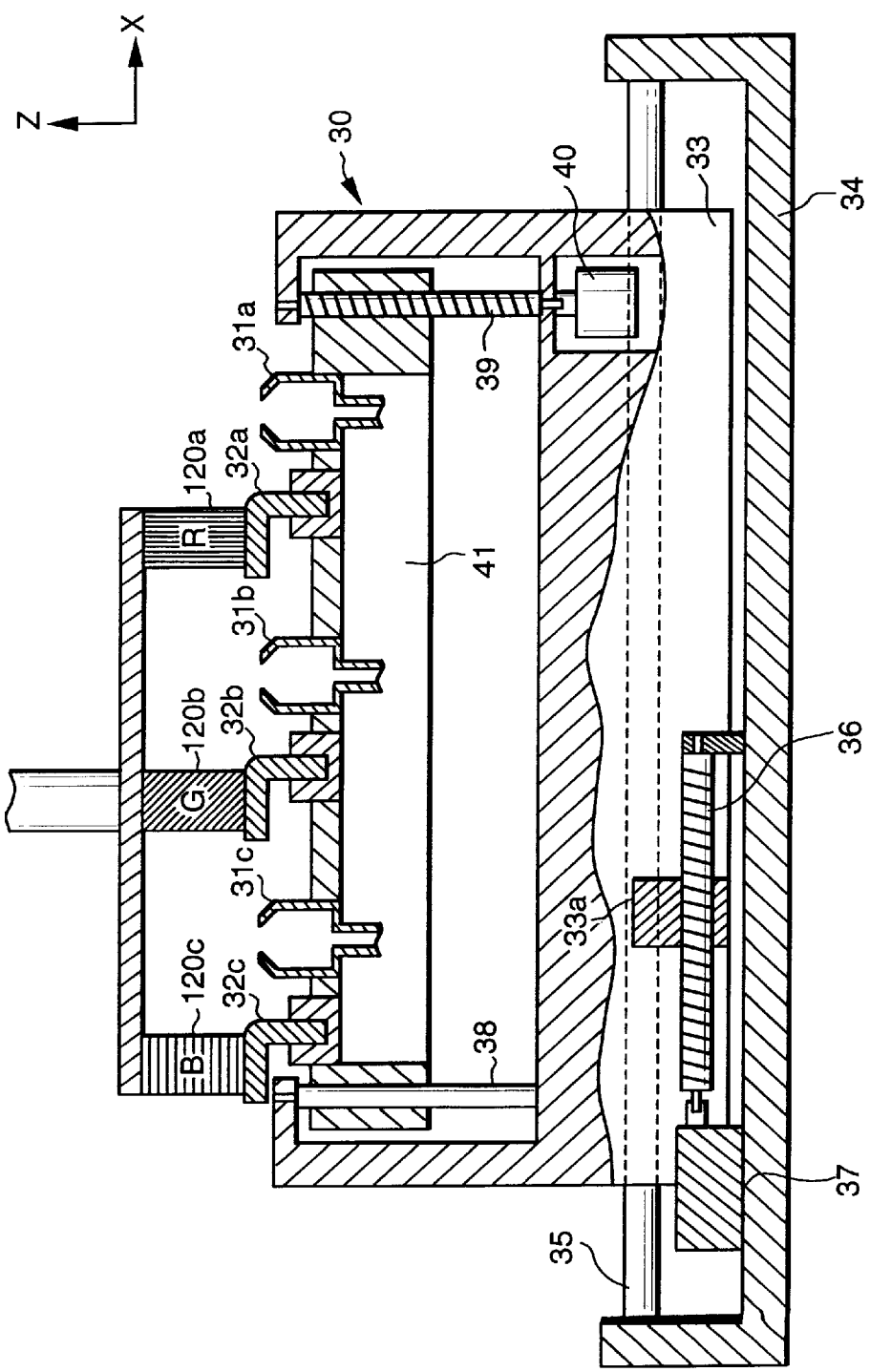
FIG. 10 is a sectional view showing a state in which the restoring unit is performing a wiping operation.

FIG. 8 is a perspective view showing the structures of the restoring unit 30 and a pivoting mechanism for the ink-jet heads 120a, 120b, and 120c. FIG. 9 is a sectional side view showing a restoring operation for the ink-jet heads which is performed by the restoring unit. FIG. 10 is a sectional side view showing a wiping operation for the ink-jet heads which is performed by the restoring unit.

Referring to FIGS. 8 to 10, reference numerals 31a, 31b, and 31c respectively denote caps corresponding to the red head 120a, the green head 120b, and the blue head 120c of the ink-jet head IJH. The caps 31a, 31b, and 31c cover the nozzle surfaces of the respective inkjet heads 120a, 120b, and 120c, as shown in FIG. 9, while the ink-jet heads 120a, 120b, and 120c are not used for coloring of a color filter on the glass substrate 1, thereby preventing the nozzles from becoming incapable of discharging inks. Assume that an ink discharging operation using the ink-jet heads 120a, 120b, and 120c is resumed after a predetermined pause. In this case, even if the caps 31a, 31b, and 31c are used, no inks may be discharged or inks may be discharged askew, i.e., a discharge failure or an askew discharge may occur, in an initial period of the discharging operation, owing to the influences of an increase in the viscosity of inks and the like. In this case, after the inks are discharged in predetermined amounts or more, the normal state is restored, and the inks are discharged straight. When such a failure occurs during coloring of the glass substrate 1, pixels may be not colored by inks or inks may not be shot at proper positions, resulting in a defective color filter. To prevent such a phenomenon, inks are discharged in predetermined amounts into the caps 31a, 31b, and 31c before the glass substrate 1 is colored. That is, a pre-discharging operation is performed.

In this embodiment, this pre-discharging operation is performed by using the caps. However, ink-receiving portions designed specifically for pre-discharging may be formed at positions other than those of the caps.

An ink pressurizing motor (not shown) is used to periodically pressurize or circulate inks from the side on which inks are supplied to the respective ink-jet heads 120a, 120b, and 120c so as to forcibly discharge bubbles and dust, which remain in the nozzles and cause a discharge failure, out of the nozzles, thereby always maintaining the ink-jet heads 120a, 120b, and 120c in normal states (pressuring/restoring operation). The caps 31a, 31b, and 31c cap the nozzles to prevent inks from being excessively discharged from the nozzles, and also receive the discharged inks.

Reference numerals 32a, 32b, and 32c denote blades (wiping members) for wiping the nozzle surfaces. As a material for the blades, an absorbent material such as sponge is preferably used. As shown in FIG. 10, when a stage 33 in the restoring unit 30 moves in the X direction, the blades 32a, 32b, and 32c wipe off inks adhering to the nozzle surfaces of the ink-jet heads 120a, 120b, and 120c, or ink mists adhering to the nozzle surfaces which are produced when inks are discharged.

The restoring unit 30 is placed on a stage 30' for pivoting the restoring unit 30 in the direction indicated by an arrow A so that the caps and blades of the restoring unit can be matched with the inclination angle of the ink-jet heads. The stage 30' incorporates a mechanism for attaching/detaching the overall restoring unit 30 to/from the color filter manufacturing apparatus at a predetermined position.

The ink-jet heads 120a, 120b, and 120c are connected to a motor 150 for pivoting these heads within a plane. By rotating this motor 150, an inclination angle θ of each ink-jet head with respect to the scanning direction in FIG. 6 is adjusted. With this operation, a plurality of types of color filters with different pixel pitches can be manufactured by using one color filter manufacturing apparatus. A main body 121 of the ink-jet head IJH incorporates a mechanism for positioning the R, G, and B heads 120a, 120b, and 120c in the longitudinal direction. An attaching/detaching mechanism 123 for attaching/detaching the ink-jet head IJH to/from the color filter manufacturing apparatus is placed on the main body 121.

In this embodiment, the caps 31a, 31b, and 31c of the restoring unit 30 are normally placed in a predetermined direction perpendicular to the scanning direction (X direction) of the color filter substrate 1, as shown in FIG. 5. When a restoring operation for the ink-jet heads 120a, 120b, and 120c is to be performed, the inclination angle θ of each ink-jet head is set to 0° by the motor 150, so that the direction of each ink-jet head coincides with that of a corresponding cap. Only when the color filter substrate 1 is to be actually colored, the ink-jet heads 120a, 120b, and 120c are pivoted through the angle θ by the motor 150, so that the nozzle pitch of each ink-jet head is matched with the pixel pitch of the color filter substrate 1. In this manner, color filters having various pixel pitches can be manufactured by using one color filter manufacturing apparatus while the direction of the restoring unit 30 is kept constant.

A mechanism for moving the blades 32a, 32b, and 32c in the X and Z directions will be described next with reference to FIGS. 9 and 10.

Referring to FIGS. 9 and 10, a guide shaft 35 is mounted a base 34 of the restoring unit 30 along the X-axis direction, and a feed screw 36 is rotatably supported on the base 34 to be parallel to the guide shaft 35. A motor 37 is connected to an end portion of the feed screw 36. The feed screw 36 is rotated/driven by the motor 37. The stage 33 is supported on the guide shaft 35 to be slidable in the X-axis direction. A female thread to be threadably engaged with the feed screw 36 is formed on a protruding portion 33a of the stage 33. When, therefore, the feed screw 36 is rotated/driven by the motor 37, the stage 33 is slid/driven in the X-axis direction.

A guide shaft 38 is mounted on the stage 33 along the Z-axis direction, and a feed screw 39 is supported on the stage 33 to be parallel to the guide shaft 38. A motor 40 is connected to an end portion of the feed screw 39. The feed screw 39 is rotated/driven by the motor 40. A stage 41 is supported on the guide shaft 38 to be slidable in the Z-axis direction, and a female thread to be threadably engaged with the feed screw 39 is formed on the stage 41. When, therefore, the feed screw 39 is rotated/driven by the motor 40, the stage 41 is slid/driven in the Z-axis direction.

Since the caps 31a, 31b, and 31c and the blades 32a, 32b, and 32c are arranged on the stage 41, when the stages 33 and 41 move in the X-axis and Z-axis directions, respectively, the caps and the blades are moved/driven in the X and Z directions.

A wiping operation for the ink-jet heads will be described next with reference to FIGS. 9 and 10.

Assume that a discharging/restoring operation for the ink-jet heads 120a, 120b, and 120c is performed in the state shown in FIG. 9. In this case, to wipe the nozzle surfaces of the ink-jet heads to which inks adhere after this discharging/restoring operation, the stage 33 is moved in the X-axis direction to bring the blades 32a, 32b, and 32c into tight contact with the nozzle surfaces of the ink-jet heads 120a, 120b, and 120c, as shown in FIG. 10.

In this embodiment, after the blade 32a is brought into tight contact with the nozzle surfaces of the inkjet head 120a, the stage 33 is moved in the X-axis direction-to wipe the nozzle surfaces.

Although the wiping operation for the ink-jet head 120a has been described above, wiping operations for the ink-jet heads 120b and 120c are performed in the same manner.

Figure 11:
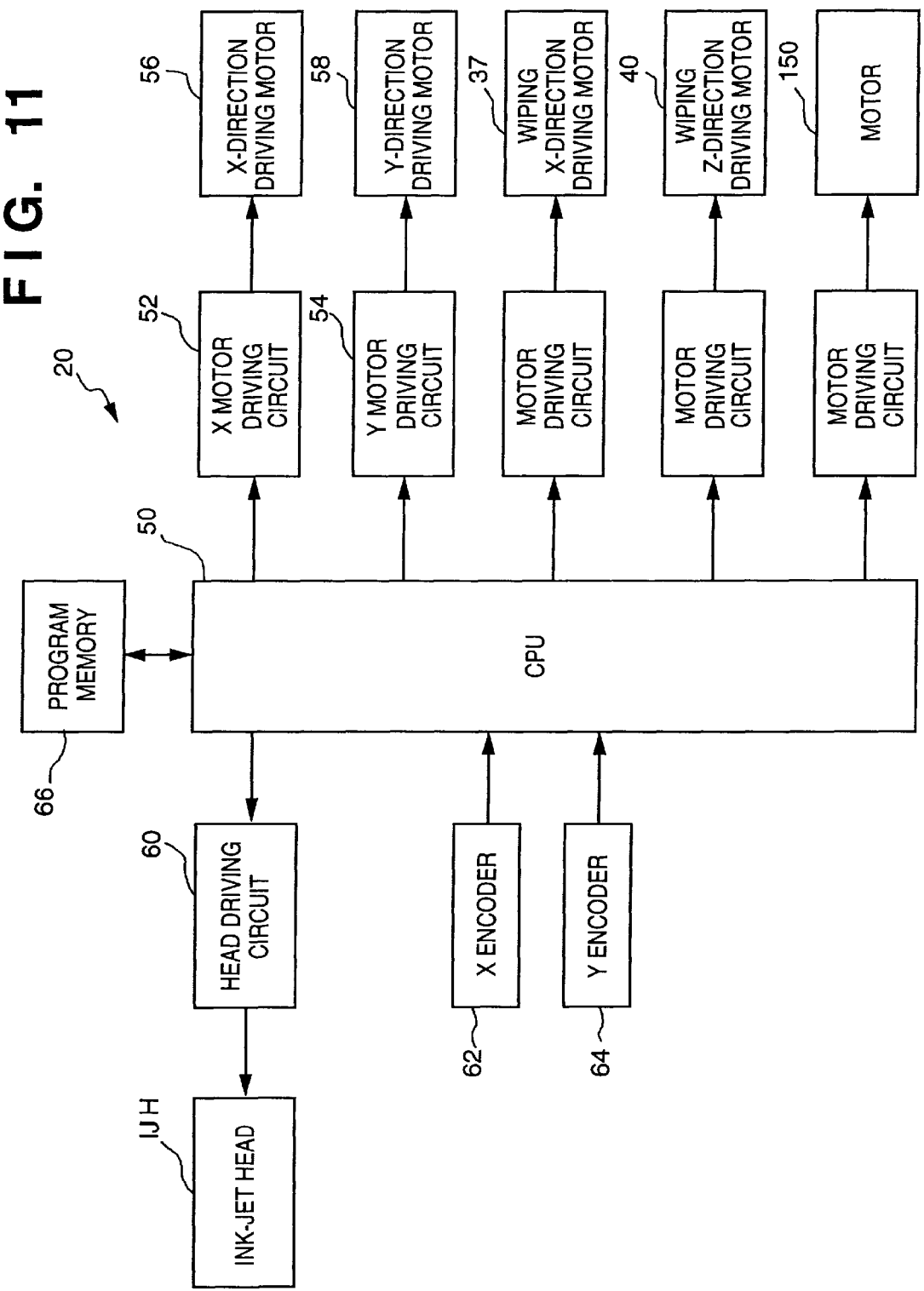
FIG. 11 is a block diagram showing the schematic arrangement of the manufacturing apparatus of the embodiment.

FIG. 11 is a block diagram showing the arrangement of the color filter manufacturing apparatus according to this embodiment.

Referring to FIG. 11, X- and Y-direction driving motors 56 and 58 for driving the X-Y table 22 in the X and Y directions are connected to a CPU 50 for controlling the overall operation of the manufacturing apparatus via X and Y motor driving circuits 52 and 54. The motors 37 and 40 in the restoring unit 30 are also connected to the CPU 50 via motor driving circuits.

The ink-jet head IJH is also connected to the CPU 50 via a head driving circuit 60. Furthermore, X and Y encoders 62 and 64 for detecting the position of the X-Y table 22 is connected to the CPU 50. With this arrangement, position information on the X-Y table 22 is input to the CPU 50. In addition, a control program in a program memory 66 is input to the CPU 50. The CPU 50 moves the X-Y table 22 in accordance with this control program and position information from the X and Y encoders 62 and 64. With this operation, a desired grating frame (pixel) on the glass substrate 1 is brought to a position below the ink-jet head IJH, and an ink having a desired color is discharged into the frame to color it, thereby coloring the glass substrate 1. In this case, the ink-jet heads 120a, 120b, and 120c are pivoted through the angle θ by the motor 150 connected to the CPU 50 through the motor driving circuit such that each nozzle pitch coincides with each pixel pitch. A color filter is manufactured by performing the above coloring operation for each pixel. Every time coloring of the glass substrate 1 is complete, the restoring unit 30 mounted on an end portion of the X-Y table 22 is moved to a position immediately below the ink-jet head IJH, and the blades 32a, 32b, and 32c are moved in the X and Z directions by the motors 37 and 40, thus performing a wiping operation. In addition, the caps 31a, 31b, and 31c are moved, and a pre-discharging operation is performed. During these operations, the glass substrate 1 having undergone the coloring process is replaced with a glass substrate 1 before coloring by a substrate convey unit (not shown).

Various changes and modifications of the above embodiments can be made without departing the spirit and scope of the invention.

In the above embdiment, the ink-jet head IJH is pivoted only when coloring of a color filter is performed, whereas the ink-jet head IJH is restored to a position perpendicular to the scanning direction in other operations. The following methods are available as methods of matching the angular position of the ink-jet head IJH with that of the restoring unit.

In the first method, when the nozzle pitch of the ink-jet head IJH is to be matched with a pixel pitch, the ink-jet head IJH is replaced with another head instead of being pivoted, and the restoring unit 30 is also replaced with another unit suited for the new head. According to this method, an ink-jet head and a restoring unit can be designed in their simplest form in accordance with the pixel pitch and size of a color filter to be manufactured, thus facilitating design. This method is most efficient when the type of color filter to be manufactured is changed once or so per month.

In the second method, the ink-jet head IJH itself is replaced as in the first method, and the restoring unit 30 is rotated in accordance with the mounting angle of the head. To pivot the restoring unit 30 in this case, the stage 30' shown in FIG. 8 is moved. According to this method, since the restoring unit having a complicated structure need not be replaced, the positioning process is simplified as compared with the first method.

In the third method, the ink-jet head IJH is pivoted to match the nozzle pitch with a pixel pitch in every operation as well as a coloring operation, whereas the restoring unit 30 is replaced with another unit suited for the pivot angle of the ink-jet head. According to this method, a plurality of types of ink-jet heads need not be prepared, and hence the manufacturing cost of the ink-jet head can be reduced, as in the first embodiment.

In the fourth method, the ink-jet head IJH is always pivoted in every operation as in the third method, and the restoring unit 30 is also pivoted by the stage 30' to an angle corresponding to the pivot angle of the ink-jet head. This method facilitates the positioning process, and hence is the optimal method when the type of color filter to be manufactured is changed frequently, e.g., several times per day.

As described above, various methods are available in addition to the method in the first embodiment. The optimal method is preferably selected in accordance with the frequency of the positioning process, the size, resolution, and cost of a color filter substrate, and the like.

FIG. 12 shows the relationship between the nozzle pitch of an ink-jet head to be used, the size of a color filter to be manufactured, and the inclination angle corresponding to a pixel pitch.

According to the above description, the present invention is applied to the print apparatus of the system, among various ink-jet print systems, which has a means (e.g., an electrothermal converter or laser light) for generating heat energy as energy used to discharge an ink, and changes the state of an ink by using the heat energy. According to this system, a high-density, high-definition print operation can be realized.

As for the typical structure and principle, it is preferable that the basic structure disclosed in, for example, U.S. Pat. Nos. 4,723,129 or 4,740,796 is employed. The above method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electrothermal converter disposed to face a sheet or a fluid passage which holds the fluid (ink) to a level higher than levels at which film boiling takes place are applied to the electrothermal converter in accordance with print information so as to generate heat energy in the electrothermal converter and to cause the heat effecting surface of the print head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. Nos. 4,463,359 or 4,345,262 is employed. If conditions disclosed in U.S. Pat. No. 4,313,124 which is an invention relating to the temperature rising ratio at the heat effecting surface are employed, a satisfactory print result can be obtained.

As an alternative to the structure (linear fluid passage or perpendicular fluid passage) of the print head disclosed in each of the above inventions and having an arrangement that discharge ports, fluid passages and electrothermal converters are combined, a structure having an arrangement that the heat effecting surface is disposed in a bent region and disclosed in U.S. Pat. Nos. 4,558,333 or 4,459,600 may be employed. In addition, the following structures may be employed: a structure having an arrangement that a common slit is formed to serve as a discharge section of a plurality of electrothermal converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a print head of the full line type having a length corresponding to the maximum width of a recording medium which can be printed by the print apparatus, either the construction which satisfies its length by a combination of a plurality of print heads as disclosed in the above specifications or the construction as a single full line type print head which has integrally been formed can be used.

In addition, the invention is effective for a print head of the freely exchangeable chip type which enables electrical connection to the print apparatus main body or supply of ink from the main device by being mounted onto the apparatus main body, or for the case by use of a print head of the cartridge type provided integrally on the print head itself.

It is preferred to additionally employ the print head restoring means and the auxiliary means provided as the component of the present invention because the effect of the present invention can be further stabled. Specifically, it is preferable to employ a print head capping means, a cleaning means, a pressurizing or suction means, an electrothermal converter, an another heating element or a preheating means constituted by combining them and a pre-discharging mode in which a discharging operation is performed independently from the print operation in order to stably perform the print operation.

Although a fluid ink is employed in the above embodiments of the present invention, an ink which solidifies at the room temperature or lower, or an ink which softens or liquifies at the room temperature may be used. That is, any ink which liquifies when a recording signal is supplied may be used.

Furthermore, an ink which is solidified when it is caused to stand, and liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present invention. In the above case, the ink may be of a type which is held as fluid or solid material in a recess of a porous sheet or a through hole at a position to face the electrothermal converter as disclosed in Japanese Patent Laid-Open No. 54-56847 or Japanese Patent Laid-Open No. 60-71260. It is the most preferred way for the ink to be adapted to the above film boiling method.

As has been described above, according to the present invention, with the use of the pivoting mechanism for the ink-jet head, color filters having various pixel pitches can be manufactured while the direction of the restoring means remains the same. The method of the present invention is very effective especially for the manufacture of a color filter because of the unique necessity to match the nozzle pitch of the ink-jet head with the pixel pitch.

In addition, this method can quickly cope with a case in which various types of color filters are to be manufactured in small quantities.

The present invention is not limited to the above embodiments and various changes and modifications can be made within the spirit and scope of the present invention. Therefore, to apprise the public of the scope of the present invention the following claims are made.

What is claimed is:

1. A color filter manufacturing apparatus for manufacturing a color filter having a plurality of filter elements by discharging ink onto a substrate from an ink-jet head having a plurality of ink discharge nozzles while scanning the ink-jet head relative to the substrate, said apparatus being capable of manufacturing color filters having different intervals between the filter elements in a direction perpendicular to the scanning direction, said apparatus comprising:

pivoting means for pivoting said ink-jet head relative to the scanning direction;

restoring means for restoring an ink discharging state of said ink-jet head; and control means for controlling a pivot angle of said ink-jet head, said control means controlling the pivot angle of the ink-jet head to a first angle based on the interval between the filter elements in the direction perpendicular to the scanning direction when the substrate is being scanned by the ink-jet head, and said control means controlling the pivot angle of the ink-jet head to a second angle corresponding with an angle of said restoring means when the ink discharging state of the ink-jet head is being restored, wherein the second angle is changed when the interval between the filter elements of the color filter to be manufactured is changed.

2. The apparatus according to claim 1, wherein said ink-jet head includes a plurality of discharging nozzles arranged in a direction perpendicular to the scanning direction at a pitch that does not necessarily coincide with a pitch of the pixels, and the pitch of the discharging nozzles is matched with the pitch of the pixels by pivoting said ink-jet head through a predetermined angle with respect to the scanning direction.

3. The apparatus according to claim 1, wherein said ink-jet head is a head for discharging an ink by using heat energy, said head having a heat energy generator for generating heat energy applied to the ink.

4. The method according to claim 3, wherein when said ink-jet head is pivoted to the second angle, an arranging direction of the ink discharge nozzles of the ink-jet head matches a longitudinal direction of a cap of the restoring means when the ink discharging state of the ink-jet head is restored.

5. The apparatus according to claim 1, wherein when said ink-jet head is pivoted to the second angle, an arranging direction of the ink discharge nozzles of the ink-jet head matches a longitudinal direction of a cap of the restoring means when the ink discharging state of the ink-jet head is restored.

6. A color filter manufacturing method for manufacturing a color filter having a plurality of filter elements by discharging ink onto a substrate from an ink-jet head having a plurality of ink discharge nozzles while scanning the ink jet head relative to the substrate, said method being capable of manufacturing color filters having different intervals between the filter elements in a direction perpendicular to the relative scanning direction, said method comprising the steps of:

pivoting said ink-jet head to a first angle relative to the scanning direction;

performing a coloring operation on the substrate by discharging the ink while scanning said ink-jet head relative to the substrate in a state in which said ink-jet head is pivoted to the first angle; and restoring an ink discharging state of said ink-jet head by pivoting said ink-jet head to a second angle, relative to the scanning direction, corresponding with an angle of restoring means, wherein the second angle is changed when the interval between the filter elements of the color filter to be manufactured is changed.

7. The method according to claim 6, wherein said ink-jet head includes a plurality of discharging nozzles arranged in a direction perpendicular to the scanning direction at a pitch that does not necessarily coincide with a pitch of the pixels, and the pitch of the discharging nozzles is matched with the pitch of the pixels by pivoting said ink-jet head to the first angle.

8. The method according to claim 6, wherein said ink-jet head is a head for discharging an ink by using heat energy, said head having a heat energy generator for generating heat energy applied to the ink.

9. A color filter manufacturing apparatus for manufacturing a color filter having a plurality of filter elements by discharging ink onto a substrate from an ink-jet head having a plurality of ink discharge nozzles while scanning the ink-jet head relative to the substrate, said apparatus being capable of manufacturing color filters having different intervals between the filter elements in a direction perpendicular to the relative scanning direction, said apparatus comprising:

setting means for setting an angle of said ink jet head relative to the scanning direction based on the interval between the filter elements in the direction perpendicular to the scanning direction so that intervals between the ink discharging nozzles in the direction perpendicular to the scanning direction correspond to the intervals between the filter elements in the direction perpendicular to the scanning direction;

restoring means for restoring an ink discharging state of said ink-jet head and positioning means for matching relative positions of said ink-jet head and said restoring means so that the angle of said ink-jet head set by the setting means corresponds to an angle of the restoring means relative to the scanning direction.

10. The apparatus according to claim 9, wherein said setting means sets the angle of said ink jet head relative to the scanning direction by replacing said ink-jet head with another ink-jet head, and said positioning means matches the relative positions of said ink-jet head and said restoring means with each other by replacing said restoring means with another restoring means.

11. The apparatus according to claim 9, wherein said setting means sets the angle of said ink jet head relative to the scanning direction by replacing said ink-jet head with another ink-jet head, and said positioning means matches the relative positions of said ink-jet head and said restoring means with each other by rotating said restoring means.

12. The apparatus according to claim 9, wherein said by pivoting said ink-jet head, and said positioning means matches the relative positions of said ink-jet head and said restoring means with each other by replacing said restoring means with another restoring means.

13. The apparatus according to claim 9, wherein said setting means sets the angle of said ink let head relative to the scanning direction by pivoting said ink-jet head, and said positioning means matches the relative positions of said ink-jet head and said restoring means with each other by pivoting said restoring means.

14. The apparatus according to claim 9, wherein said setting means sets the angle of said ink jet head relative to the scanning direction by pivoting said ink-jet head only when a print operation is performed.

15. The apparatus according to claim 9, wherein said ink-jet head is a head for discharging an ink by using heat energy, said head having a heat energy generator for generating heat energy applied to the ink.

16. The apparatus according to claim 9, wherein said positioning means matches the relative positions of said ink-jet head and said restoring means with each other by adapting an angle of the restoring means to the angle of the ink-jet head set by the setting means.

17. The apparatus according to claim 9, wherein said positioning means matches an arranging direction of the ink discharge nozzles of the ink-jet head and a longitudinal direction of a cap of the restoring means.

18. A color filter manufacturing method for manufacturing a color filter having a plurality of filter elements by discharging ink onto a substrate from an ink-jet head having a plurality of ink discharge nozzles while scanning the ink jet head relative to the substrate, said method being capable of manufacturing color filters having different intervals between the filter elements in a direction perpendicular to the relative scanning direction, said method comprising the steps of:

setting an angle of said ink-jet head relative to the scanning direction based on the interval between the filter elements in the direction perpendicular to the scanning direction, so that intervals between the ink discharging nozzles in the direction perpendicular to the scanning direction correspond to the intervals between the filter elements in the direction perpendicular to the scanning direction;

restoring an ink discharging state of said ink-jet head by restoring means; and matching relative positions of said ink-jet head and restoring means so that the angle of said ink-jet head set in the setting step corresponds to an angle of the restoring means relative to the scanning direction.

19. The method according to claim 18, wherein the setting step comprises setting an angle of said ink-jet head relative to the scanning direction by replacing said ink-jet head with another ink-jet head, and the adjusting step comprises matching the relative positions of said ink-jet head and said restoring means with each other by replacing said restoring means with another restoring means.

20. The method according to claim 18, wherein the setting step comprises setting an angle of said ink-jet head relative to the scanning direction by replacing said ink-jet head with another ink-jet head, and the adjusting step comprises matching the relative positions of said ink-jet head and said restoring means with each other by pivoting said restoring means.

21. The method according to claim 18, wherein the setting step comprises setting an angle of said ink-jet head relative to the scanning direction by pivoting said ink-jet head, and the adjusting step comprises matching the relative positions of said ink-jet head and said restoring means with each other by replacing said restoring means with another restoring means.

22. The method according to claim 18, wherein the setting step comprises setting an angle of said ink-jet head relative to the scanning direction by pivoting said ink-jet head, and the adjusting step comprises matching the relative positions of said ink-jet head and said restoring means with each other by pivoting said restoring means.

23. The method according to claim 18, wherein the setting step comprises setting an angle of said ink-jet head relative to the scanning direction by pivoting said ink-jet head only when a print operation is performed.

24. The method according to claim 18, wherein said ink-jet head is a head for discharging an ink by using heat energy, said head having a heat energy generator for generating heat energy applied to the ink.

25. The method according to claim 18, wherein, in the matching step, the relative positions of said ink-jet head and said restoring means are matched with each other by adapting an angle of the restoring means to the angle of the ink-jet head set in the setting step.

26. The method according to claim 18, wherein, in the matching step, an arranging direction of the ink discharge nozzles of the ink-jet head and a longitudinal direction of a cap of the restoring means are matched.

* * * * *

UNITED STATES PATENT AND TRADEMARK OFFICE
CERTIFICATE OF CORRECTION

PATENT NO.    : 6,227,647, B1
DATED         : May 8, 2001
INVENTOR(S)   : Makoto Akahira et al.

It is certified that error appears in the above-identified patent and that said Letters Patent is hereby corrected as shown below:

Column 1
Line 45, "G." should read -- G, --.

Column 2,
Line 14, "Conventionally," should read -- ¶Conventionally, --.

Column 3,
Line 30, "inkjet" should read -- ink-jet --.

Column 4,
Line 38, "31" should read -- 3' --.

Column 6,
Line 11, "R." should read -- R, --.

Column 7,
Line 50, "10" should read -- 102 --.

Column 8,
Line 5, "inkjet" should read -- ink-jet --.

Column 9,
Line 21, "mounted" should read -- mounted on --;
Line 58, "inkjet" should read -- ink-jet --; and
Line 59, "direction-to" should read -- direction to --.

Column 10,
Line 10, "is" should read -- are --;
Line 38, "departing" should read -- departing from --; and
Line 40, "embdiment" should read -- embodiment --.

Column 11,
Line 45, "take place" should read -- cause --.

Column 12,
Line 29, "an" should read -- and --.

Column 13,
Line 47, "method" should read -- apparatus --.

UNITED STATES PATENT AND TRADEMARK OFFICE
CERTIFICATE OF CORRECTION

PATENT NO. : 6,227,647, B1
DATED : May 8, 2001
INVENTOR(S) : Makoto Akahira et al.

It is certified that error appears in the above-identified patent and that said Letters Patent is hereby corrected as shown below:

Column 14,
Line 32, "ink jet" should read -- ink-jet --;
Line 49, "ink jet" should read -- ink-jet --;
Line 56, "ink jet" should read -- ink jet --;
Line 61, "said" should read -- said setting means sets the angle of said ink-jet head relative to the scanning direction --; and
Line 67, "ink let" should read -- ink-jet --.

Column 15,
Line 6, "ink jet" should read -- ink-jet --; and
Line 25, "ink" should read -- ink ---.

Signed and Sealed this

Sixth Day of August, 2002

Attest:

JAMES E. ROGAN
Attesting Officer    Director of the United States Patent and Trademark Office